US012743788B2

(12) United States Patent
Kerofsky et al.

(10) Patent No.: US 12,743,788 B2
(45) Date of Patent: Sep. 22, 2026

(54) PRE-WARPING FOR GLOBAL MOTION COMPENSATION IN OPTICAL FLOW IMAGE PROCESSING

(71) Applicant: QUALCOMM Incorporated, San Diego, CA (US)

(72) Inventors: Louis Joseph Kerofsky, San Diego, CA (US); Bing Han, San Diego, CA (US); Kuan-Ting Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 18/523,248

(22) Filed: Nov. 29, 2023

(65) Prior Publication Data

US 2024/0221179 A1 Jul. 4, 2024

Related U.S. Application Data

(60) Provisional application No. 63/477,895, filed on Dec. 30, 2022.

(51) Int. Cl.
*G06T 7/20* (2017.01)
*G06T 3/18* (2024.01)

(52) U.S. Cl.
CPC . *G06T 7/20* (2013.01); *G06T 3/18* (2024.01)

(58) Field of Classification Search
CPC .. G06T 7/20; G06T 3/18; G06T 7/215; G06T 7/269
See application file for complete search history.

(56) References Cited

U.S. PATENT DOCUMENTS

2015/0146022 A1* 5/2015 Pham ................. H04N 23/6811 348/208.4
2018/0310918 A1* 11/2018 Fan ........................ A61B 8/485
2020/0294246 A1* 9/2020 Larson ................... G06V 20/40
2021/0358296 A1* 11/2021 Lee ......................... G06T 7/246
2022/0153259 A1* 5/2022 Suddamalla .............. G06T 7/20
2022/0327716 A1* 10/2022 Masci ..................... G06T 7/215
2024/0087266 A1* 3/2024 Guler ...................... G06T 19/20
2024/0144434 A1* 5/2024 Levinshtein ........... H04N 5/145

FOREIGN PATENT DOCUMENTS

CN 111915659 A * 11/2020 ........... G06T 3/4007

* cited by examiner

*Primary Examiner* — Amandeep Saini
*Assistant Examiner* — Andrew S Budisalich
(74) *Attorney, Agent, or Firm* — Norton Rose Fulbright US LLP/ QUALCOMM Incorporated

(57) ABSTRACT

This disclosure provides systems, methods, and devices for vehicle driving assistance systems that support image processing. In a first aspect, a method of image processing includes receiving image data comprising a first image frame and a second image frame; determining a global motion model corresponding to the first image frame and the second image frame; warping the first image frame based on the global motion model to determine a warped first image frame; and determining a local flow based on the warped first image frame and the second image frame. Other aspects and features are also claimed and described.

24 Claims, 6 Drawing Sheets

PRE-WARPING FOR GLOBAL MOTION COMPENSATION IN OPTICAL FLOW IMAGE PROCESSING

CROSS-REFERENCE TO RELATED APPLICATIONS

This application claims the benefit of U.S. Provisional Patent Application No. 63/477,895, entitled, "PRE-WARPING FOR GLOBAL MOTION COMPENSATION IN OPTICAL FLOW IMAGE PROCESSING," filed on Dec. 30, 2022, which is expressly incorporated by reference herein in its entirety.

TECHNICAL FIELD

Aspects of the present disclosure relate generally to image processing, and more particularly, to methods and systems suitable for supplying driving assistance or for autonomous driving using image data.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, using an electronic device, etc. Sometimes circumstances create situations that even attentive drivers are unable to identify in time to prevent vehicular collisions. Aspects of this disclosure provide improved systems for assisting drivers in vehicles with enhanced situational awareness when driving on a road.

Situational awareness by a vehicle is often dependent on image capture devices attached to the vehicle. The image capture devices acquire information regarding the environment surrounding the vehicle. However, in applications such as vehicles, camera motion between image frames is inherent and creates a challenge to processing the images to understand the environment around the vehicle. The camera motion results in even static objects contributing motion to the images, which may cause the determination of longer-than-average motion vectors when processing the images. Such longer motion vectors may result in the need for an increased search range in image processing, such as optical flow algorithms. The long motion vectors may be made more common by various aspects of imaging system implementations, such as zoomed image capture devices with a continuous range of scene depth, high vehicle speeds, high image resolutions, and/or reduced imaging frame rate to provide bandwidth for many camera inputs. As a result, overall processing difficulty may increase, resulting in the need for additional computing resources and/or causing additional processing delays.

A model of ground plane motion that accounts for camera-specific orientation and distortion may be used to remove motion from a scene represented by an image pair, and may reduce the search range needed for location flow estimation. Thus, a low complexity basis model may be used to compute the global flow efficiently. The global flow may be modelled and removed, location motion search may be performed, and results may be combined.

Example embodiments use a global model to remove some motion via warping, calculate optical flow to find local motion, and then combine the global model and optical flow to obtain a total flow of motion between image frames. Some embodiments may include generating a model of the global camera motion between frames, including processing to account for fisheye distortion from one or more image capture devices. The model may be used to warp one of the frames of an image pair to remove the effect of global camera motion. Following warping, an optical flow method may be used to estimate the residual local motion that deviates from the model. The warping to remove global motion prior to optical flow may be referred to as pre-warping, indicating the warping occurs prior to the optical flow processing. The estimated local motion may then be combined with the modeled global motion to produce a total motion between pixels of the frames.

In some embodiments, a method may include receiving image data comprising a first image frame and a second image frame; determining a global motion model corresponding to the first image frame and the second image frame; warping the first image frame based on the global motion model to determine a warped first image frame; and determining an optical flow based on the warped first image frame and the second image frame.

Although particular example applications for a vehicle and other automotive settings are described in embodiments herein, other uses of the optical flow may benefit from similar global pre-warping when an appropriate global motion model can be produced. For example, mobile camcorder stabilization may be performed with a gyroscope sensor providing data to generate a global model for the camcorder motion.

In one aspect, a method is provided for image processing for use in a vehicle assistance system. The method also includes receiving image data may include a first image frame and a second image frame. The method also includes determining a global motion model corresponding to the first image frame and the second image frame. The method also includes warping the first image frame based on the global motion model to determine a warped first image frame. The method also includes determining a local flow based on the warped first image frame and the second image frame.

In another aspect, an apparatus is provided that includes a memory storing processor-readable code and at least one processor coupled to the memory. The at least one processor may be configured to execute the processor-readable code to cause the at least one processor to perform operations that include receiving image data may include a first image frame and a second image frame. The operations also include determining a global motion model corresponding to the first image frame and the second image frame. The operations also include warping the first image frame based on the global motion model to determine a warped first image frame. The operations also include determining a local flow based on the warped first image frame and the second image frame.

In a further aspect, a vehicle is provided that includes at least one image sensor, a memory storing processor-readable code, at least one processor coupled to the memory, and at least one processor. The processor may be configured to execute the processor-readable code to cause at least one processor to perform operations, including: receiving image data comprising a first image frame and a second image frame captured by the at least one image sensor; determining a global motion model corresponding to the first image frame and the second image frame; warping the first image frame based on the global motion model to determine a warped first image frame; and determining a local flow based on the warped first image frame and the second image frame.

An additional aspect includes a non-transitory computer-readable medium storing instructions that, when executed by a processor, cause the processor to perform operations that include receiving image data comprising a first image frame and a second image frame; determining a global motion model corresponding to the first image frame and the second image frame; warping the first image frame based on the global motion model to determine a warped first image frame; and determining a local flow based on the warped first image frame and the second image frame.

In an additional aspect of the disclosure, a non-transitory computer-readable medium stores instructions that, when executed by a processor, cause the processor to perform operations. The operations include receiving image data comprising a first image frame and a second image frame; determining a global motion model corresponding to the first image frame and the second image frame; warping the first image frame based on the global motion model to determine a warped first image frame; determining an optical flow based on the warped first image frame and the second image frame; and/or determining a total flow based on the optical flow and the global motion model.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support pre-warping image processing to remove global motion from an image frame to improve functionality of optical flow processing performed on an image pair comprising the image frame.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the pre-warping may reduce the complexity and processing costs for the optical flow algorithm to improve efficiency and/or improve accuracy of the optical flow algorithm. Improved accuracy and/or efficiency of optical flow in applications such as vehicles may result in better object detection, and a resulting improvement in driver assistance systems.

One major benefit of improved object tracking is that it allows vehicle control systems to more accurately navigate vehicles around obstacles. This can be particularly useful in situations where there may be unexpected obstructions or road conditions that could pose a hazard to drivers. Additionally, improved tracking can help to improve overall safety on the roads by reducing vehicle collisions. With better tracking capabilities, vehicles can be made more responsive to nearby obstacles and can be routed around detected obstacles more efficiently. These improvements can also extend to driver assistance systems, which can benefit from increased monitoring capabilities. By expanding the number, type, and variety of surrounding vehicles that can be detected, these systems can offer more accurate alerts and assistance to drivers when necessary, without generating unnecessary notifications or distractions.

Figure 1:
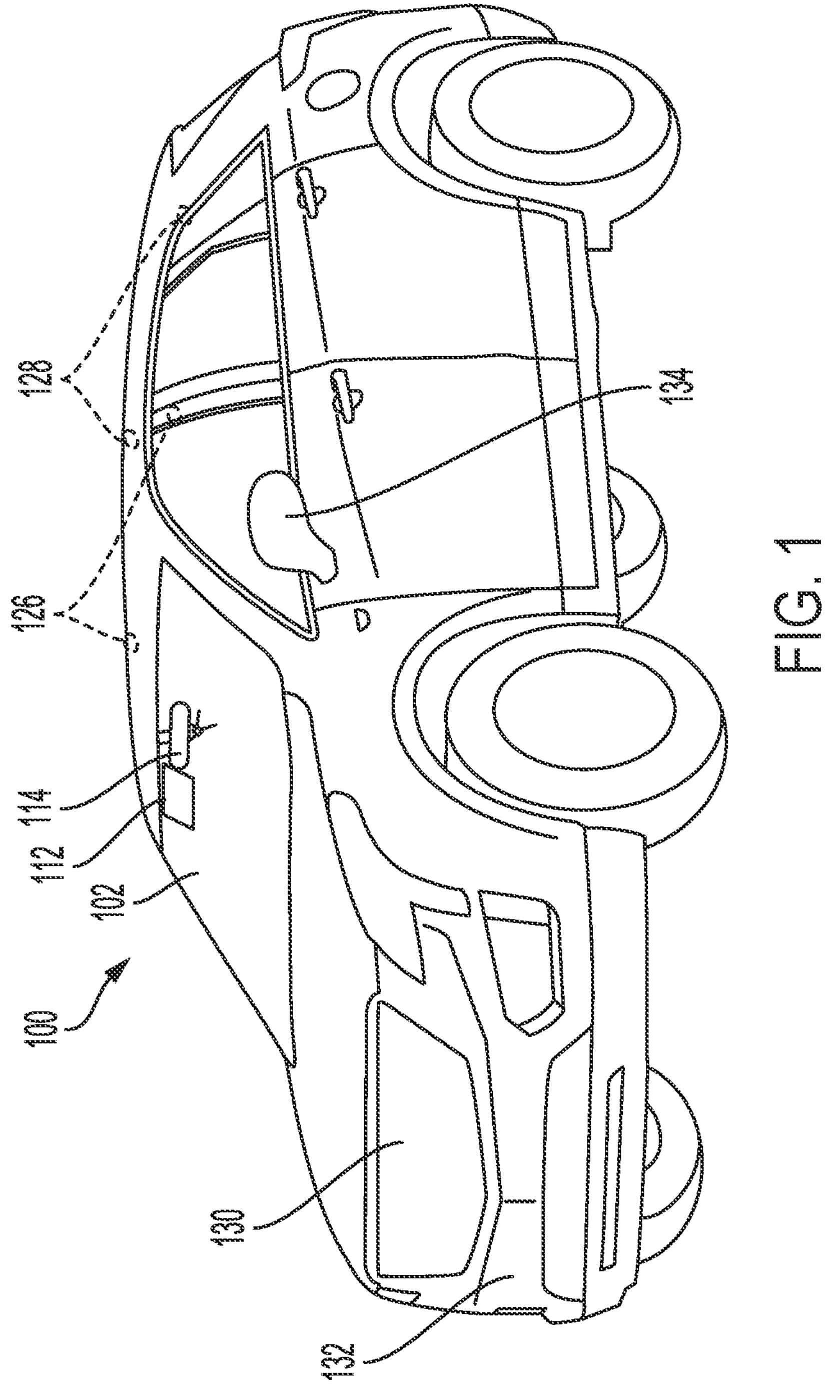
FIG. 1 is a perspective view of a motor vehicle with a driver monitoring system according to embodiments of this disclosure.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and, in particular, the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
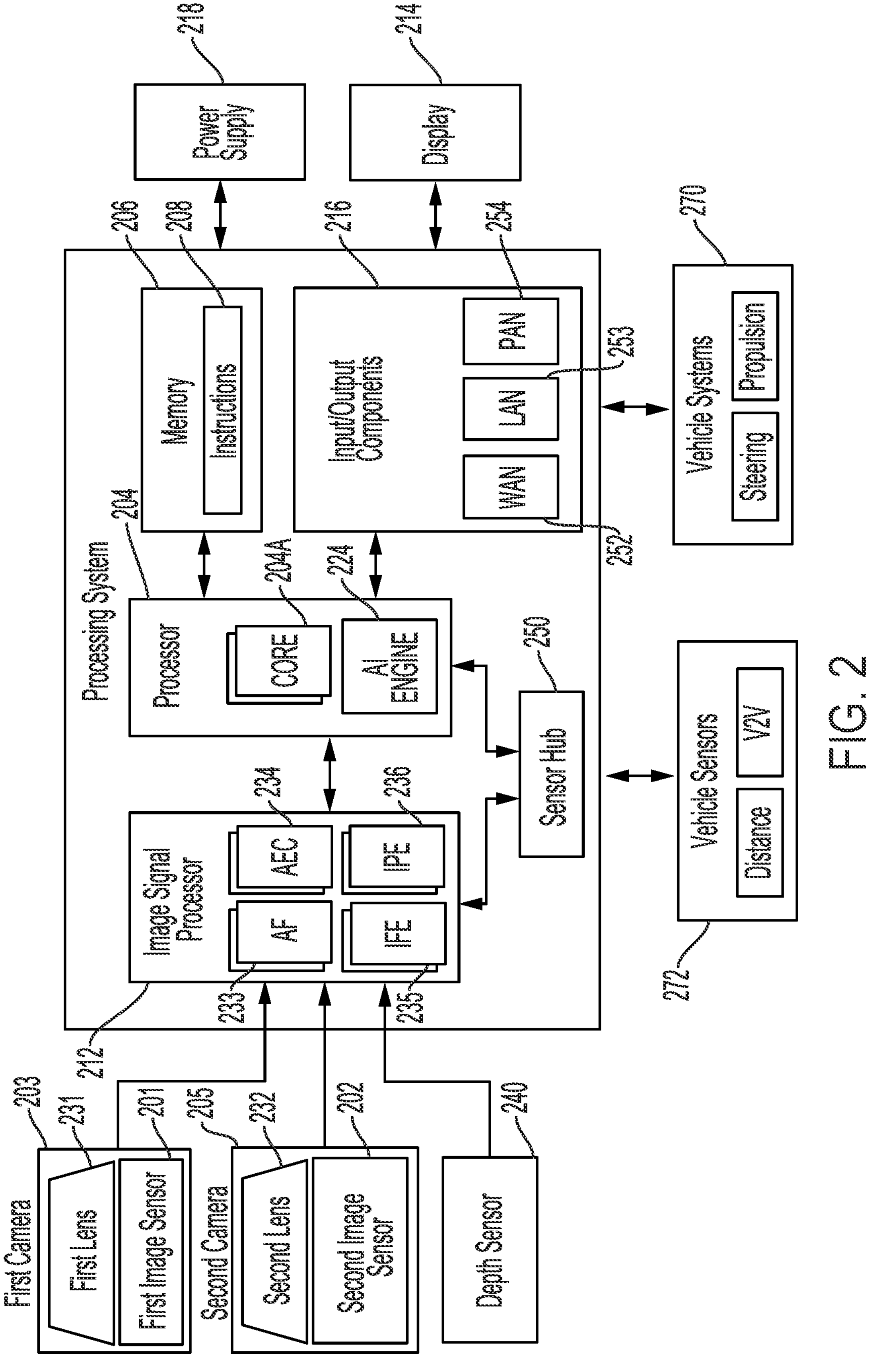
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors, accelerometer, gyroscope, other inertial measurement units (IMUs) or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor

204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
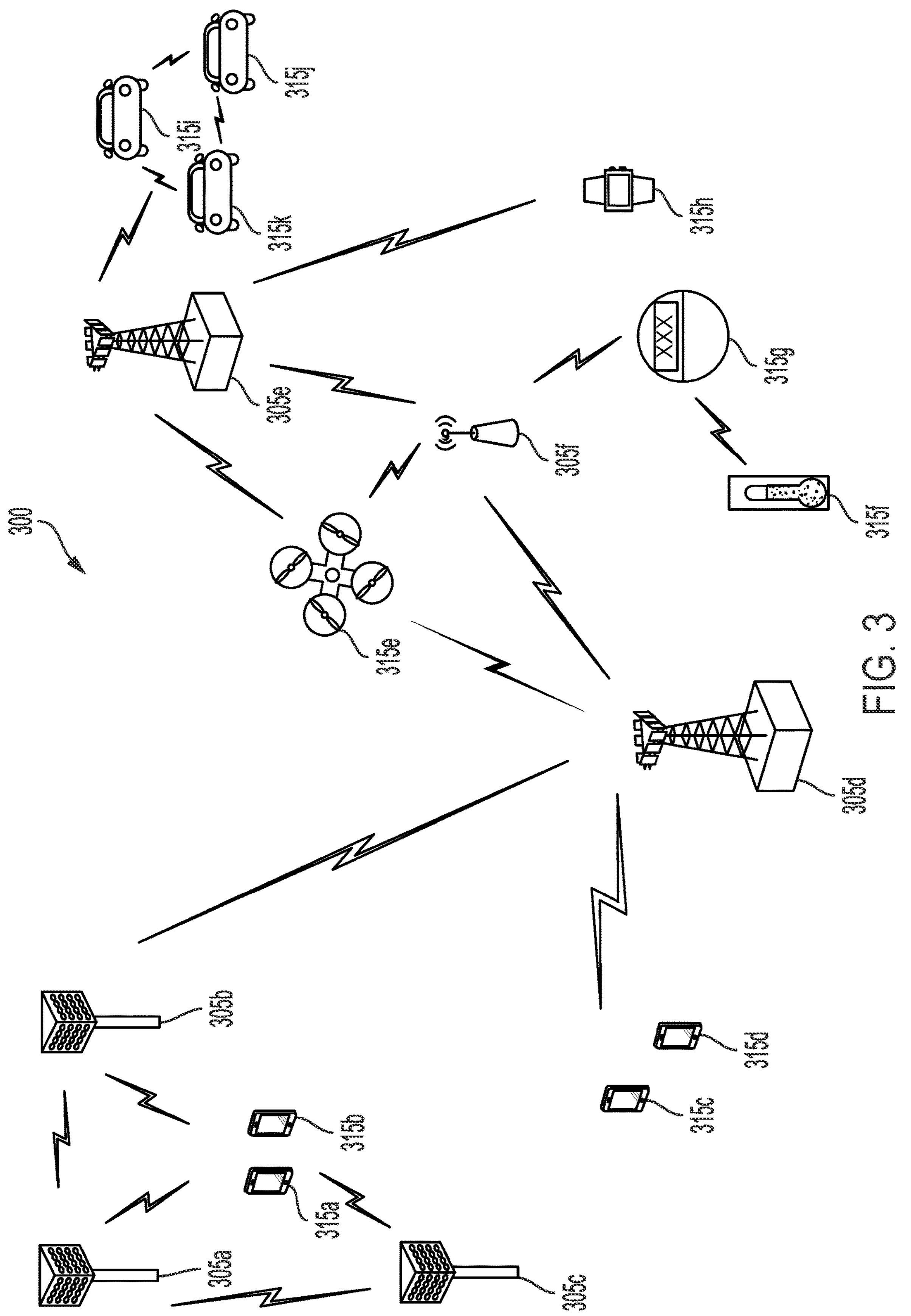
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations **305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f*** is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315*a-j* are specifically shown as vehicles, a vehicle may employ the communication configuration described with reference to any of the UEs 315*a*-315*k*.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315*a*-315*d* of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315*e*-315*k* illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305*a*-305*c* serve UEs 315*a* and 315*b* using 3D beamforming and coordinated spatial techniques, such as coordinated multipoint (CoMP) or multi-connectivity. Macro base station 305*d* performs backhaul communications with base stations 305*a*-305*c*, as well as small cell, base station 305*f*. Macro base station 305*d* also transmits multicast services which are subscribed to and received by UEs 315*c* and 315*d*. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315*e*, which is a drone. Redundant communication links with UE 315*e* include from macro base stations 305*d* and 305*e*, as well as small cell base station 305*f*. Other machine type devices, such as UE 315*f* (thermometer), UE 315*g* (smart meter), and UE 315*h* (wearable device) may communicate through wireless network 300 either directly with base stations, such as small cell base station 305*f*, and macro base station 305*e*, or in multi-hop configurations by communicating with another user device which relays its information to the network, such as UE 315*f* communicating temperature measurement information to the smart meter, UE 315*g*, which is then reported to the network through small cell base station 305*f*. Wireless network 300 may also provide additional network efficiency through dynamic, low-latency TDD communications or low-latency FDD communications, such as in a vehicle-to-vehicle (V2V) mesh network between UEs 315*i*-315*k* communicating with macro base station 305*e*.

Aspects of the vehicular systems described with reference to, and shown in, FIG. 1, FIG. 2, and FIG. 3 may include image processing, including optical flow processing and pre-warping of received image frames.

The objective of pre-warping may be to remove known camera motion from the frame sequence before local flow estimation. This may allow the local flow estimation to operate with low complexity either with respect to search range in traditional methods or network size in neural network-based approaches. In the neural network case, this reduced complexity may enable support of a variety of camera orientations with the same model or processing pipeline, since the known camera orientation and global motion may be removed, reducing or avoiding the need to learn a range of possible camera operating modes (such as to train and deploy multiple separate machine learning models or processing pipelines). An additional benefit is the reduction in range of needed training data and conditions.

Figure 4:
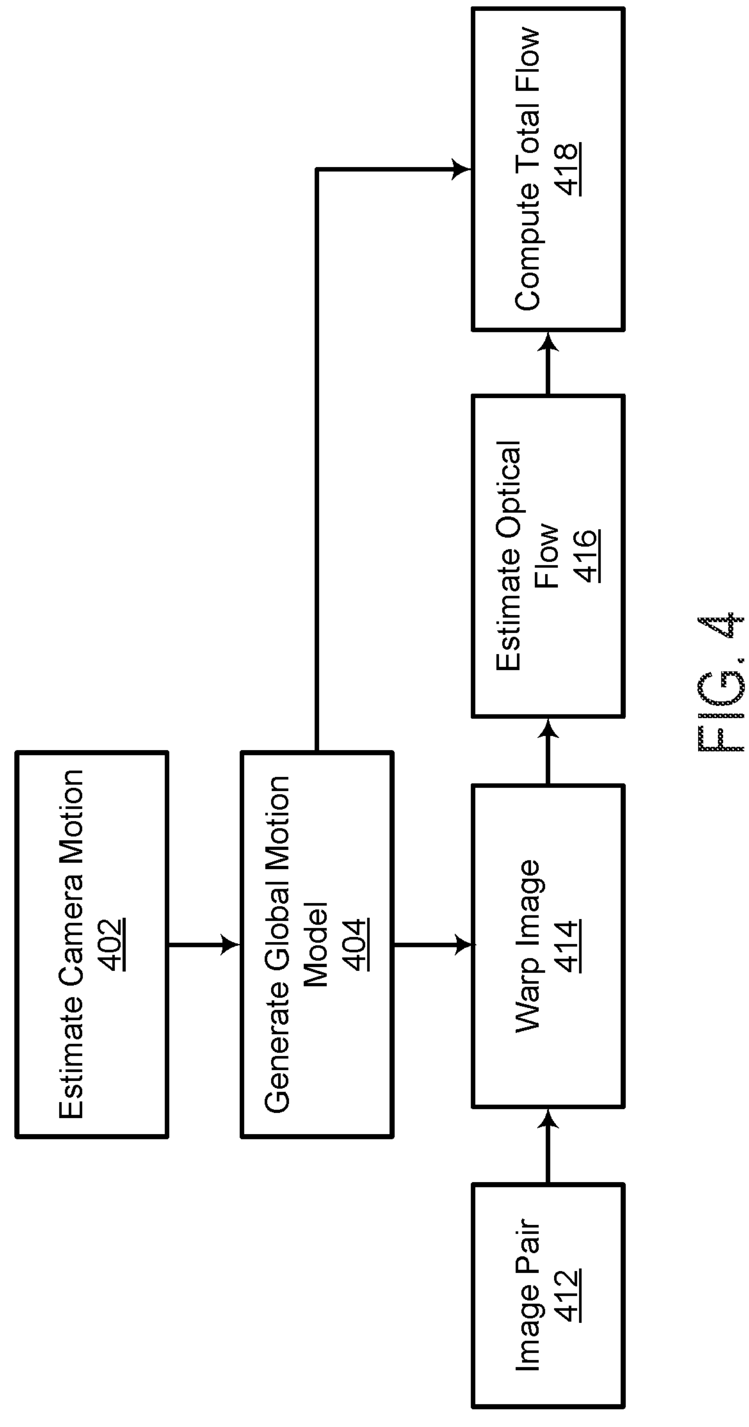
FIG. 4 is a block diagram illustrating an example image flow for processing image pairs with pre-warping based on camera motion according to one or more aspects of this disclosure.

FIG. 4 is a block diagram illustrating an example image flow for processing image pairs with pre-local flow warping based on camera motion according to one or more aspects of this disclosure. In certain implementations, the method 400 may be implemented or otherwise performed at least in part by a computing device located within or otherwise associated with a vehicle, such as the vehicle 100. For example, the method 400 may be performed at least in part by the processing system in FIG. 2, such as by the image signal processor 212, by the processor 204, by the memory 206, or combinations thereof.

At step 402, camera motion is estimated and, at step 404, a global motion model is generated. The camera motion estimation at step 402 may be based on an inertial measurement unit (IMU), such as an accelerometer or gyroscope. In certain implementations, the IMU data may be supplemented by or replaced by other data, including assuming a default typical speed (such as 5 m/s). In additional or alternative implementations, camera motion may be estimated based on analysis of current and prior video frames and used to develop a global model of motion for the cameras. The global motion model generated at block 404 may be a field determined from a motion model based on the camera motion at step 402. In particular, the global motion model may be determined to indicate the motion of the camera relative to the global reference frame.

In vehicle applications, the global motion model may include a translational motion of the camera, which may dominate the flow field. For example, the vehicle may be moving faster relative to the ground (such as a real-world reference frame or global reference frame) than other objects (such as other vehicles) are moving relative to the vehicle). Rather than assuming the translation is zero or that the depth of the scene is constant as may be needed for other implementations (such as a projective model) to give global constants, a general translation motion (such as of the camera, of the vehicle, or combinations thereof) may be determined using one or more of the techniques discussed above.

In certain implementations, when determining the global motion model, the height above the ground plane for the cameras may be considered fixed or consistent, rather than assuming the depth of a captured scene is constant. Additionally or alternatively, it may be assumed that a camera attached to a vehicle has fixed pitch and yaw orientation angles relative to the vehicle, and that the vehicle moves in a plane along a 1-D curve. In such instances, the yaw of the camera may be fixed relative to the vehicle but can change relative to the real-world reference plane as the yaw of the vehicle changes. Accordingly, the form of a motion model in the pixel domain at a pixel with row r and column c may have the following form shown below in the case of a pinhole camera:

$$\frac{\partial r}{\partial t} = \alpha \cdot (r - r_{horizon})^2 + \beta \cdot \left(c - \frac{W}{2}\right) \cdot (r - r_{horizon})$$

$$\frac{\partial c}{\partial t} = \alpha \cdot \left(c - \frac{W}{2}\right) \cdot (r - r_{horizon}) + \beta \cdot \left(c - \frac{W}{2}\right)^2 + \beta \cdot f^2$$

where:

the image width is in pixels is W, the row of the horizon is $r_{horizon}$, and the camera focal length is f in pixels.

In such implementations, the horizon row ($r_{horizon}$) may describe the pitch of the camera. For example, if the camera were horizontal the horizon row would correspond to the middle of the image. The values of parameters α and β may depend on the motion dynamics of the vehicle, combining motion and extrinsic camera orientation relative to the real-world reference plane. For example, α may be proportional to a speed of the vehicle and a component of motion in the direction of the camera's extrinsic orientation (such as forward motion for a forward-facing camera). As another example, β may be proportional to a speed of the vehicle and a component of motion that is perpendicular to the extrinsic orientation (such as lateral motion for a forward-facing camera). In certain implementations, α and β may be inversely proportional to the frame rate of the camera and/or a focal length of the camera. In certain implementations, the three-dimensional (3D) global motion model may be described with only two degrees of freedom, e.g., speed and yaw rate. In implementations where the camera is a fisheye camera, basis flow fields corresponding to basic types of vehicle motion (such as forward motion, left turn, right turn) may be separately computed (such as based on IMU data), and the global motion model may be computed as a weighted sum of the basis flow fields.

At step 412, an image pair is received, and at step 414, one or both images of the image pair 412 may be warped based on the global motion model of step 404. The image pair 412 may be image frames received from two different cameras, such as cameras at different locations on the vehicle. As another example, the image pair 412 may be acquired from a wide-angle fish-eye camera and a conventional camera with overlapping fields of view. The image pair 412 may be image frames recorded sequentially in time from these two different cameras or from a single camera. The image pair 412 may be represented as $I_n$ and $I_{n+1}$. One of the image frames, such as a first image frame, may represent a prior image frame and another of the image frames, such as a second image frame may represent a current image frame. The global motion model generated at step 404 may be represented by a motion model (MM) flow vector $F_{mm}$, such as a flow vector for the global motion model. That vector may be used to generate a warped frame, represented by $W_n$, from $I_{n+1}$. In certain implementation, pixel values for the warped image are determined according to pixel values for corresponding pixel locations within the second image frame, where the corresponding pixel locations are offset by the global motion model. For example, pixel values within the warped image $W_1$ may be determined as pixel values for corresponding pixel locations within $I_{n+1}$, offset by the motion model flow vector. As a specific example, the warped image $W_n(p)$ may be determined as:

$$W_n(p) = I_{n+1}\left(p + \vec{F}_{mm}(p)\right)$$

where p is a corresponding pixel position within the warped image and the flow vector, and wherein $W_n(p)$ is computed across a plurality of pixel positions to form the warped image.

At step 416, a local flow is estimated based on a warped image of the image pair obtained at step 412. For example, the local flow may be determined as an optical flow based on a warped first image frame and the second image frame (which may be unwarped). The optical flow may be determined to indicate the motion of objects or features between a warped first image frame and the second image frame. For example, the computation at step 416 may be based on a local motion between $I_n$ and $W_n$, represented by vector $L_n(p)$. Local flow processing at step 416 may include optical flow, which is an estimation used to determine the motion between pixels of a pair of frames. Optical flow may provide motion information including, for example, detection of moving objects, structure from motion, and driving route planning and prediction.

Optical flow as in step 416 may be used in computer vision. One application is in automotive use cases wherein significant challenges occur: high speed, constant and fast camera motion, fish-eye distortion, low lighting and poor weather. Conventional methods use a search window to find corresponding points in two images. A common trade-off in such implementations is between search range (accuracy) and complexity (number of search points). Other conventional techniques include resolution searches and fast subsampled searches. A semi global matching method includes a cost aggregation technique to minimize a global cost function, which includes both matching distortion and spatial smoothness of global motion model. In some embodiments, fisheye distortion may be applied to reduce the effects of fisheye distortion on the matching process.

At step 418 the total flow is computed based on the local flow and the global motion model. The calculation of total flow may be determined as a summation. In certain implementations, the total flow may be calculated by summing a local flow and a motion model flow (such as for the global motion model), where the motion model flow is offset by the local flow. For example, $$\overrightarrow{\text{Flow}}_{total}(p) = \vec{L_n}(p) + \vec{F}_{cmm}\left(p + \vec{L_n}(p)\right)$$

In additional or alternative implementations, the total flow may be calculated summing the local flow and the model flow located at the same pixel location p. Such implementations may be an approximation of the previous total flow calculation. For example, the total flow ($\overrightarrow{\text{Flow}}_{total}(p)$) may be computed as:

$$\overrightarrow{\text{Flow}}_{total}(p) = \vec{L_n}(p) + \vec{F}_{cmm}\left(p + \vec{L_n}(p)\right) \approx \vec{L_n}(p) + \vec{F}_{cmm}(p)$$

In certain implementations, the total flow is determined to show motion between corresponding pixels of the first image frame and the second image frame. For example, the computed total flow may be determined to define the motion in the pixel domain given a vector at each point of the image pointing from the position in the first frame to the corresponding pixel in the second frame. Pixel motion may refer to determining movement of a pixel from its original location in a first image frame to a new location in a second image frame. The pixel motion determination may be based on, for example, a first parameter related to a location of the camera relative to a ground surface (e.g., road beneath a vehicle), a second parameter related to motion of the moving object (e.g., a vehicle), and/or a third parameter related to an orientation of the camera relative to the ground surface.

In operation, a dense flow may be generated from the current frame to the prior frame. Using this dense global flow, the prior frame can be warped to a reference frame in which global motion is compensated away. The local motion estimation at block 416 may operate on the pair of frames consisting of the warped prior frame and the current frame. The total motion at step 418 from prior frame to current frame will then be a combination of the global motion (prior to warping) and the estimated local motion (warped prior to current frame).

In certain implementations, the total flow may be subsequently used to determine vehicle control instructions (such as for the vehicle 100). In certain implementations, vehicle control instructions may refer to the set of commands and guidelines that directly or indirectly regulate the movement of a vehicle. These instructions may come in the form of direct vehicular control instructions, such as steering, braking, accelerating or combinations thereof. In additional or alternative implementations, vehicle control instructions may be supplementary instructions that support driver assistance programs, such as obstacle avoidance, blind spot monitoring, and other driver assistance alerts. control instructions may accordingly help drivers to maintain safe operation of vehicles while driving on roads and highways.

Figure 5:
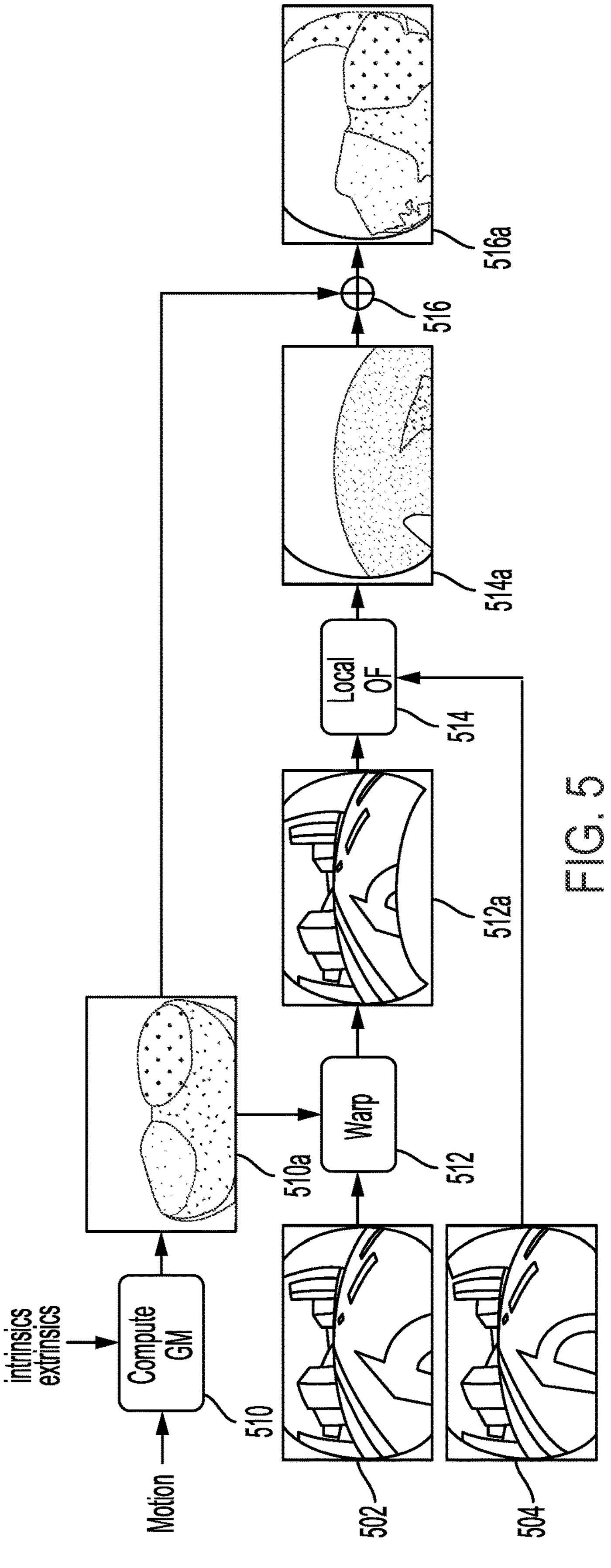
FIG. 5 is a flow chart illustrating an example method for processing image pairs with pre-warping based on camera motion according to one or more aspects of this disclosure.

One method of performing image processing according to embodiments described above is shown in FIG. 5. FIG. 5 is a flow chart illustrating an example method for processing image pairs with pre-local flow warping based on camera motion according to one or more aspects of this disclosure. Global model computation 510 produces a global motion flow 510*a* based on vehicle motion and camera intrinsics/extrinsics. The global model flow 510*a* may be used by a warp computation 512 applied to one (and in some embodiments, only one) image frame 502 to produced warped first image frame 512*a*. For example, the warp computation 512 may be performed to apply the global motion flow 510*a* to the image frame 502 to produce the warped first image frame 512*a*. A local optical flow computation 514 may be performed on the warped first image frame 512*a* and a second image frame 504 to produce a residual local flow 514*a*. The residual local flow 514*a* may be combined in summer 516 with the global model flow 510*a* to produce a total flow 516*a*. The total flow 516*a* may be used in further image processing to assist with vehicle operations. The computed total flow defines the motion in the pixel domain given a vector at each point of the image pointing from the position in the first frame to the corresponding pixel in the second frame. This motion information may be used to predict future positions of objects for route planning, collision avoidance or other uses. Pixel motion information may be used to infer depth in a scene through methods such as structure from motion. In particular, the computed total flow 516*a* may be subsequently used to determine vehicle control instructions, as noted above.

Figure 6:
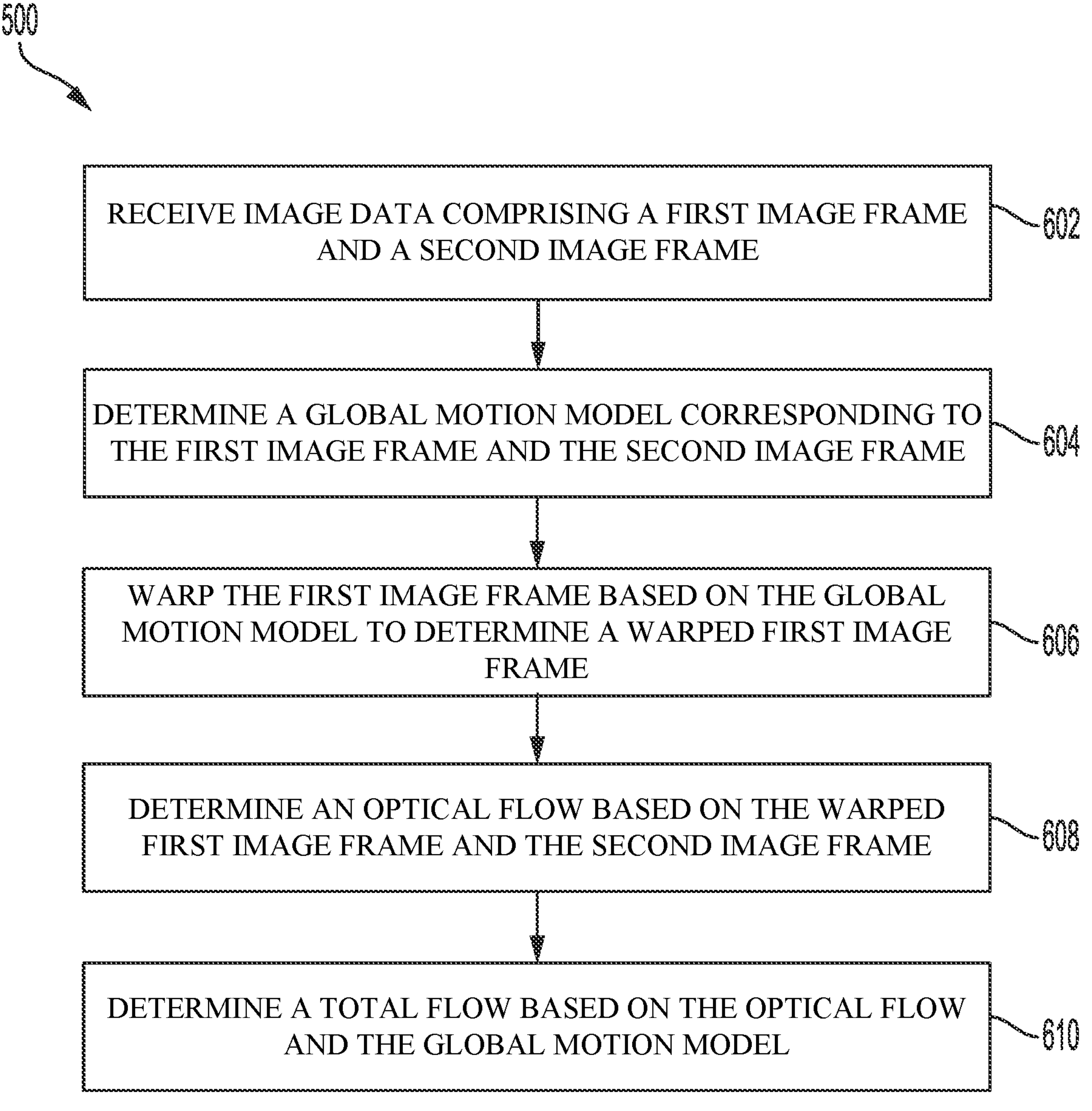
FIG. 6 is a flow chart illustrating an example method for processing image pairs with pre-warping based on camera motion according to one or more aspects of this disclosure.

One method of performing image processing according to embodiments described above is shown in FIG. 6. FIG. 6 is a flow chart illustrating an example method 600 for processing image pairs with pre-local flow warping based on camera motion according to one or more aspects of this disclosure. In certain implementations, the method 600 may be implemented or otherwise performed at least in part by a computing device located within or otherwise associated with a vehicle, such as the vehicle 100. For example, the method 600 may be performed at least in part by the processing system in FIG. 2, such as by the image signal processor 212, by the processor 204, by the memory 206, or combinations thereof.

The method 600 includes, at block 602, receiving image data from an image sensor, the data including a first image frame and a second image frame from same or different camera at the same time or different times.

At block 604, the method 600 includes determining a global motion model corresponding to the first image frame and the second image frame. The global motion model may be based on IMU data as described with reference to block 402. In some embodiments, the global motion model may be based on visual odometry (e.g., a measurement of distance traveled) of prior frame pairs. For example, the distance travelled between capturing two image frames may be estimated by differences in location for one or more objects or features within the two image frames. This distance may then be used to determine the global motion model (such as by determining the movement of the vehicle as the distance travelled).

At block 606, the method 600 includes warping the first image frame based on the global motion model to determine a warped first image frame.

At block 608, the method 600 includes determining an optical flow based on the warped first image frame and the second image frame.

At block 610, the method 600 includes determining a total flow based on the optical flow and the global motion model.

It is noted that one or more blocks (or operations) described with reference to FIGS. 4-6 may be combined with one or more blocks (or operations) described with reference to another of the figures. For example, one or more blocks (or operations) of FIG. 4 may be combined with one or more blocks (or operations) of FIG. 1-3. As another example, one or more blocks associated with FIG. 6 may be combined with one or more blocks associated with FIG. 4.

In one or more aspects, techniques for supporting vehicular operations may include additional aspects, such as any single aspect or any combination of aspects described below or in connection with one or more other processes or devices described elsewhere herein. A first aspect includes a method for image processing for use in a vehicle assistance system. The method also includes receiving image data may include a first image frame and a second image frame. The method also includes determining a global motion model corresponding to the first image frame and the second image frame. The method also includes warping the first image frame based on the global motion model to determine a warped first image frame. The method also includes determining a local flow based on the warped first image frame and the second image frame.

In a second aspect in combination with the first aspect, the global motion model is determined to indicate combined motion of a camera relative to a global reference frame. The camera captured at least one of the first image frame and the second image frame.

In a third aspect, in combination with one or more of the first aspect through the second aspect, the local flow is determined to indicate the motion of objects between the warped first image frame and the second image frame.

In a fourth aspect, in combination with one or more of the first aspect through the third aspect, pixel values for the warped first image frame are determined according to pixel values for corresponding pixel locations within the second image frame. The corresponding pixel locations are offset by the global motion model.

In a fifth aspect, in combination with one or more of the first aspect through the fourth aspect, a total flow may be determined based on the local flow and the global motion model.

In a sixth aspect, in combination with the fifth aspect, determining the total flow may include summing the local flow and the global motion model, where the global motion model is offset by the local flow.

In a seventh aspect, in combination with one or more of the fifth aspect through the sixth aspect, determining the total flow may include summing the local flow and the global motion model at corresponding pixel locations.

In an eighth aspect, in combination with one or more of the fifth aspect through the seventh aspect, pixel motion may be determined between the first image frame and the second image frame based on the total flow.

In a ninth aspect, in combination with one or more of the fifth aspect through the eighth aspect, vehicle control instructions may be determined based on the total flow.

In a tenth aspect, in combination with one or more of the fifth aspect through the ninth aspect, the total flow is determined to show motion between corresponding pixels of the first image frame and the second image frame.

In an eleventh aspect, in combination with one or more of the first aspect through the tenth aspect, the first image frame is a prior image frame and the second image frame is a current image frame.

A twelfth aspect provides an apparatus that includes a memory storing processor-readable code and at least one processor coupled to the memory. The at least one processor may be configured to execute the processor-readable code to cause the at least one processor to perform operations that include receiving image data may include a first image frame and a second image frame. The operations also include determining a global motion model corresponding to the first image frame and the second image frame. The operations also include warping the first image frame based on the global motion model to determine a warped first image frame. The operations also include determining a local flow based on the warped first image frame and the second image frame. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirteenth aspect, in combination with the twelfth aspect, the global motion model is determined to indicate combined motion of a camera relative to a global reference frame. The camera captured at least one of the first image frame and the second image frame.

In a fourteenth aspect, in combination with one or more of the twelfth aspect through the thirteenth aspect, the local flow is determined to indicate the motion of objects between the warped first image frame and the second image frame.

In a fifteenth aspect, in combination with one or more of the twelfth aspect through the fourteenth aspect, pixel values for the warped first image frame are determined according to pixel values for corresponding pixel locations within the second image frame. The corresponding pixel locations are offset by the global motion model.

In a sixteenth aspect, in combination with one or more of the twelfth aspect through the fifteenth aspect, the operations may include determining a total flow based on the local flow and the global motion model.

In a seventeenth aspect, in combination with the sixteenth aspect, determining the total flow may include summing the local flow and the global motion model. The global motion model is offset by the local flow.

In an eighteenth aspect, in combination with one or more of the sixteenth aspect through the seventeenth aspect, determining the total flow may include summing the local flow and the global motion model at corresponding pixel locations.

In a nineteenth aspect, in combination with one or more of the sixteenth aspect through the eighteenth aspect, the operations may include determining pixel motion between the first image frame and the second image frame based on the total flow.

A twentieth aspect provides a vehicle that includes at least one image sensor, a memory storing processor-readable code, at least one processor coupled to the memory, and at least one processor. The processor may be configured to execute the processor-readable code to cause at least one processor to perform operations, including: receiving image data comprising a first image frame and a second image frame captured by the at least one image sensor; determining a global motion model corresponding to the first image frame and the second image frame; warping the first image frame based on the global motion model to determine a warped first image frame; and determining a local flow based on the warped first image frame and the second image frame.

In a twenty-first aspect, in combination with the twentieth aspect, the global motion model is determined to indicate combined motion of the at least one image sensor relative to a global reference frame.

In a twenty-second aspect, in combination with one or more of the twentieth aspect through the twenty-first aspect, the local flow is determined to indicate the motion of objects between the warped first image frame and the second image frame.

In a twenty-third aspect, in combination with one or more of the twentieth aspect through the twenty-second aspect, pixel values for the warped first image frame are determined according to pixel values for corresponding pixel locations within the second image frame. The corresponding pixel locations are offset by the global motion model.

In a twenty-fourth aspect, in combination with one or more of the twentieth aspect through the twenty-third aspect, the operations may include determining a total flow based on the local flow and the global motion model.

In a twenty-fifth aspect, in combination with the twenty-fourth aspect, the operations may include determining pixel motion between the first image frame and the second image frame based on the total flow.

A twenty-sixth aspect includes a non-transitory computer-readable medium storing instructions that, when executed by a processor, cause the processor to perform operations that include receiving image data comprising a first image frame and a second image frame; determining a global motion model corresponding to the first image frame and the second image frame; warping the first image frame based on the global motion model to determine a warped first image frame; and determining a local flow based on the warped first image frame and the second image frame.

In a twenty-seventh aspect, in combination with the twenty-sixth aspect, the global motion model is determined to indicate combined motion of a camera relative to a global reference frame. The camera captured at least one of the first image frame and the second image frame.

In a twenty-eighth aspect, in combination with one or more of the twenty-sixth aspect through the twenty-seventh aspect, the local flow is determined to indicate the motion of objects between the warped first image frame and the second image frame.

In a twenty-ninth aspect, in combination with one or more of the twenty-sixth aspect through the twenty-eighth aspect, pixel values for the warped first image frame are determined according to pixel values for corresponding pixel locations within the second image frame. The corresponding pixel locations are offset by the global motion model.

In a thirtieth aspect, in combination with one or more of the twenty-sixth aspect through the twenty-ninth aspect, a total flow is determined based on the local flow and the global motion model.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing for use in a vehicle assistance system, comprising:

receiving image data comprising a first image frame and a second image frame;

determining a global motion model corresponding to the first image frame and the second image frame;

warping the first image frame based on the global motion model to determine a warped first image frame;

determining a local flow based on the warped first image frame and the second image frame;

determining a total flow based on the local flow and the global motion model, wherein determining the total flow comprises summing the local flow and the global motion model at corresponding pixel locations, wherein the global motion model is offset by the local flow; and determining vehicle control instructions based on the total flow.

2. The method of claim 1, wherein the global motion model is determined to indicate combined motion of a camera relative to a global reference frame, wherein the camera captured at least one of the first image frame and the second image frame.

3. The method of claim 1, wherein the local flow is determined to indicate motion of objects between the warped first image frame and the second image frame.

4. The method of claim 1, wherein pixel values for the warped first image frame are determined according to pixel values for corresponding pixel locations within the second image frame, wherein the corresponding pixel locations are offset by the global motion model.

5. The method of claim 1, further comprising determining pixel motion between the first image frame and the second image frame based on the total flow.

6. The method of claim 1, wherein the total flow is determined to show motion between corresponding pixels of the first image frame and the second image frame.

7. The method of claim 1, wherein the first image frame is a prior image frame and the second image frame is a current image frame.

8. An apparatus, comprising:

a memory storing processor-readable code; and at least one processor coupled to the memory, the at least one processor configured to execute the processor-readable code to cause the at least one processor to perform operations including:

receiving image data comprising a first image frame and a second image frame;

determining a global motion model corresponding to the first image frame and the second image frame;

warping the first image frame based on the global motion model to determine a warped first image frame;

determining a local flow based on the warped first image frame and the second image frame;

determining a total flow based on the local flow and the global motion model, wherein determining the total flow comprises summing the local flow and the global motion model at corresponding pixel locations, wherein the global motion model is offset by the local flow; and determining vehicle control instructions based on the total flow.

9. The apparatus of claim 8, wherein the global motion model is determined to indicate combined motion of a camera relative to a global reference frame, wherein the camera captured at least one of the first image frame and the second image frame.

10. The apparatus of claim 8, wherein the local flow is determined to indicate motion of objects between the warped first image frame and the second image frame.

11. The apparatus of claim 8, wherein pixel values for the warped first image frame are determined according to pixel values for corresponding pixel locations within the second image frame, wherein the corresponding pixel locations are offset by the global motion model.

12. The apparatus of claim 8, wherein the operations further comprise determining pixel motion between the first image frame and the second image frame based on the total flow.

13. The apparatus of claim 8, wherein the total flow is determined to show motion between corresponding pixels of the first image frame and the second image frame.

14. A vehicle, comprising:

at least one image sensor;

a memory storing processor-readable code; and at least one processor coupled to the memory, the at least one processor configured to execute the processor-readable code to cause the at least one processor to perform operations including:

receiving image data comprising a first image frame and a second image frame captured by the at least one image sensor;

determining a global motion model corresponding to the first image frame and the second image frame;

warping the first image frame based on the global motion model to determine a warped first image frame;

determining a local flow based on the warped first image frame and the second image frame;

determining a total flow based on the local flow and the global motion model, wherein determining the total flow comprises summing the local flow and the global motion model at corresponding pixel locations, wherein the global motion model is offset by the local flow; and determining vehicle control instructions based on the total flow.

15. The vehicle of claim 14, wherein the global motion model is determined to indicate combined motion of the at least one image sensor relative to a global reference frame.

16. The vehicle of claim 14, wherein the local flow is determined to indicate motion of objects between the warped first image frame and the second image frame.

17. The vehicle of claim 14, wherein pixel values for the warped first image frame are determined according to pixel values for corresponding pixel locations within the second image frame, wherein the corresponding pixel locations are offset by the global motion model.

18. The vehicle of claim 14, wherein the operations further comprise determining pixel motion between the first image frame and the second image frame based on the total flow.

19. The vehicle of claim 14, wherein the total flow is determined to show motion between corresponding pixels of the first image frame and the second image frame.

20. A non-transitory computer-readable medium storing instructions that, when executed by a processor, cause the processor to perform operations comprising:

receiving image data comprising a first image frame and a second image frame;

determining a global motion model corresponding to the first image frame and the second image frame;

warping the first image frame based on the global motion model to determine a warped first image frame;

determining a local flow based on the warped first image frame and the second image frame;

determining a total flow based on the local flow and the global motion model, wherein determining the total flow comprises summing the local flow and the global motion model at corresponding pixel locations, wherein the global motion model is offset by the local flow; and determining vehicle control instructions based on the total flow.

21. The non-transitory computer-readable medium of claim 20, wherein the global motion model is determined to indicate combined motion of a camera relative to a global reference frame, wherein the camera captured at least one of the first image frame and the second image frame.

22. The non-transitory computer-readable medium of claim 20, wherein the local flow is determined to indicate motion of objects between the warped first image frame and the second image frame.

23. The non-transitory computer-readable medium of claim 20, wherein pixel values for the warped first image frame are determined according to pixel values for corresponding pixel locations within the second image frame, wherein the corresponding pixel locations are offset by the global motion model.

24. The non-transitory computer-readable medium of claim 20, wherein the total flow is determined to show motion between corresponding pixels of the first image frame and the second image frame.

* * * * *